Aug. 13, 1935. J. A. HATTON 2,010,989
PRECIOUS METAL AMALGAMATOR
Filed March 2, 1932 3 Sheets-Sheet 1

Inventor
John Andrewson Hatton
By Thomas Bilyeu
Attorney

Aug. 13, 1935.  J. A. HATTON  2,010,989
PRECIOUS METAL AMALGAMATOR
Filed March 2, 1932   3 Sheets-Sheet 2

Inventor
John Andrewson. Hatton
By Thomas Bilyeu
Attorney

Aug. 13, 1935.  J. A. HATTON  2,010,989
PRECIOUS METAL AMALGAMATOR
Filed March 2, 1932    3 Sheets-Sheet 3
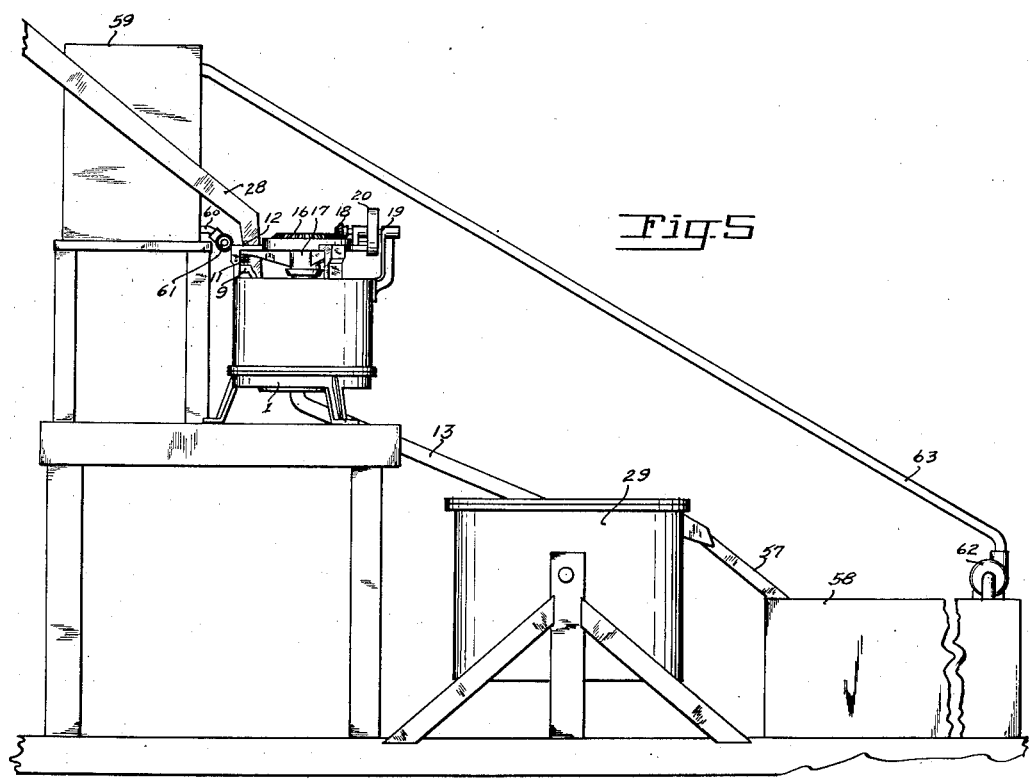
Inventor
John Andrewson Hatton
By Thomas Bieyer
Attorney Patented Aug. 13, 1935

2,010,989

UNITED STATES PATENT OFFICE 2,010,989

PRECIOUS METAL AMALGAMATOR

John Andrewson Hatton, Bellingham, Wash.

Application March 2, 1932, Serial No. 596,281

2 Claims. (Cl. 209—67)

My invention relates to means for treating and recovering of the precious metal content of related substances.

The primary step in the carrying out of my operation consists in grinding the mineral bearing mass to a relatively fine state so that it may pass through a relatively fine-meshed screen, the reduction being carried on in the presence of metallic mercury of amalgamator plates. After reduction has been effected, the effluent is transfered to an amalgamator mill where amalgamation is continued. Thereafter the treated mass may be passed over a vanner, or concentrating table, and finally delivered into a settling basin where the solids are precipitated and the liquid is returned to the delivery tank for reuse, as by being pumped thereinto.

One of the objects of my invention is to provide a simple means for the treating of materials having a precious metal content that will be simple to install, efficient to operate and that is particularly adapted for continuous operation where relatively low temperatures are encountered.

A still further object of my invention consists in providing means for the recovery of precious metals that will aid in the recovery of the precious metals in a high state of purity.

A still further object of my means of recovery of the precious metal content from a ground mass consists in the utilization of solutions that will maintain the mercury in a high state of amalgamating efficiency.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

The invention in its preferred embodiment is embodied in the accompanying drawings in which.

Figure 1:
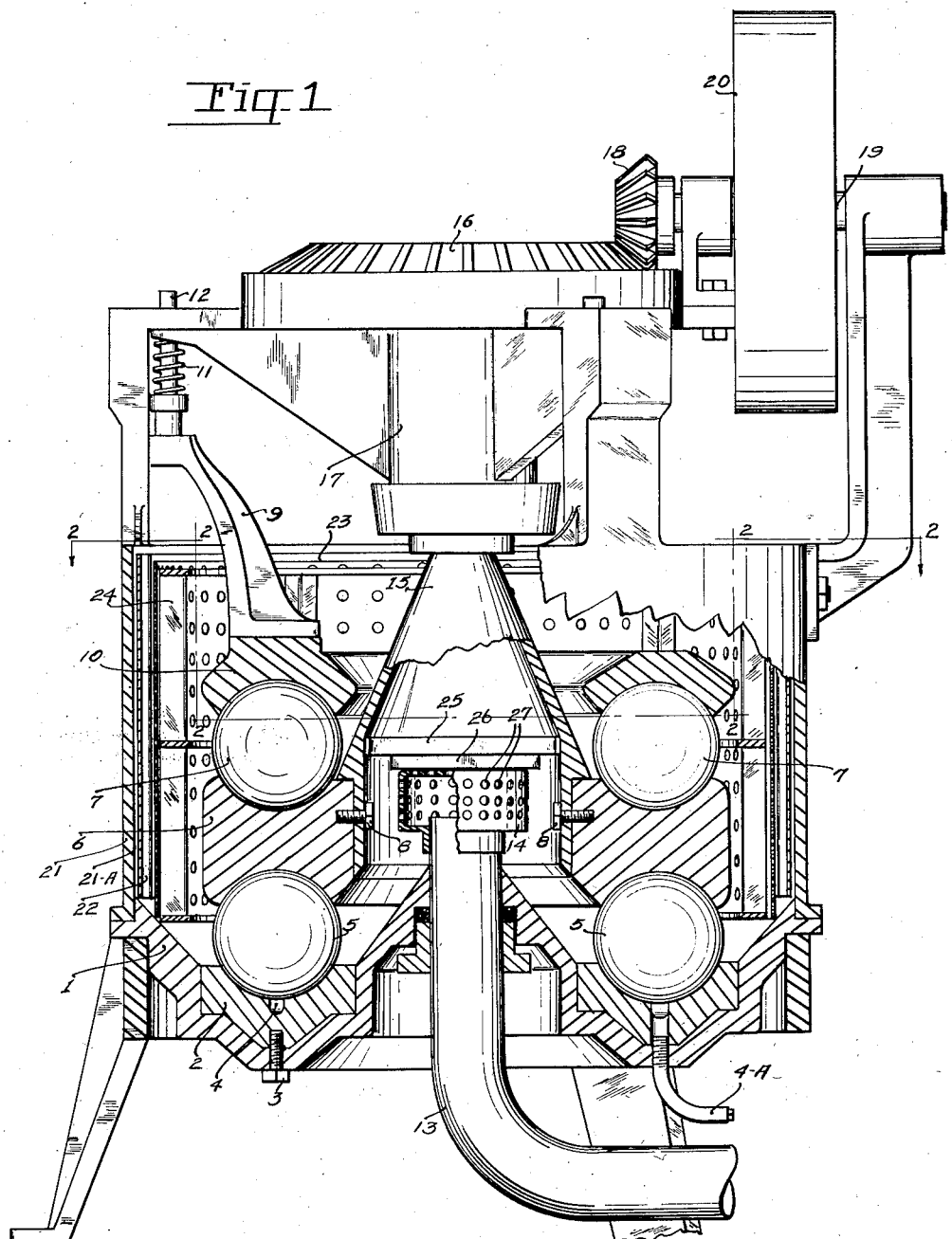
Fig. 1 is a fragmentary, sectional, side view, of the device in its essential form.
Figure 2:
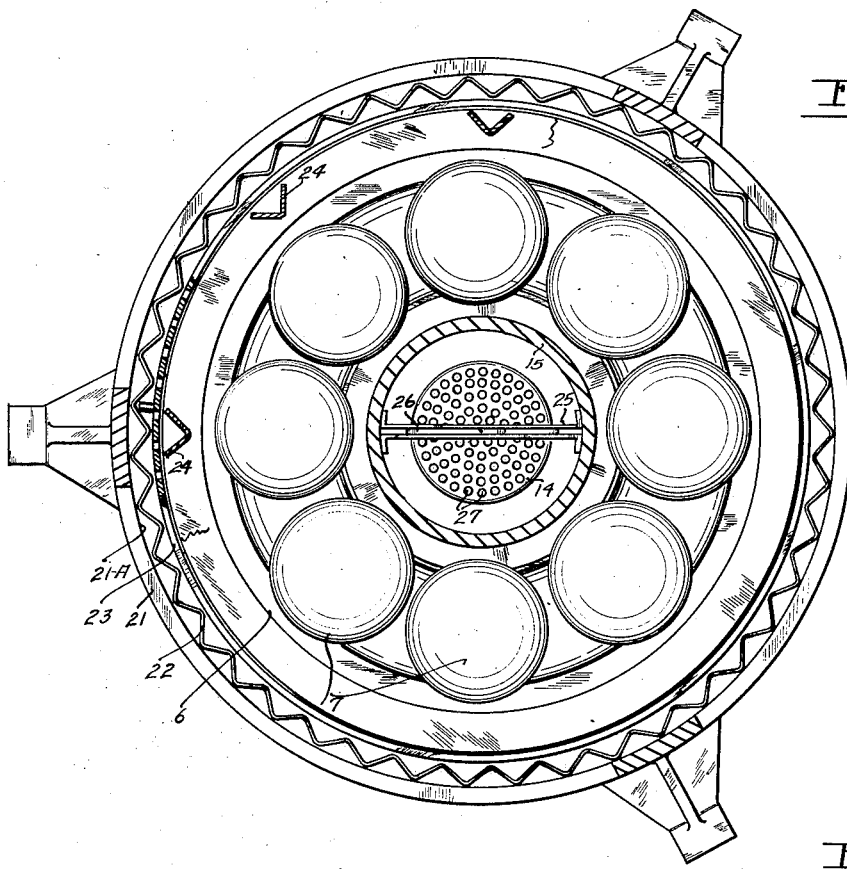
Fig. 2 is a sectional, plan view, of the mechanism illustrated in Fig. 1, taken on line 2—2 of Fig. 1, looking in the direction indicated.
Figure 4:
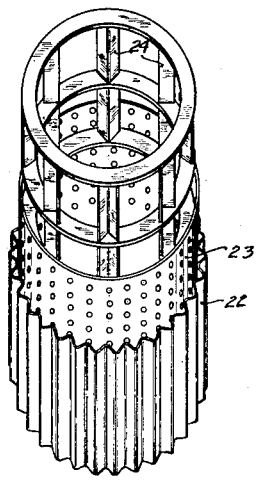
Fig. 4 is a top, perspective view, of the elements forming the removable cylindrical member.
Figure 3:
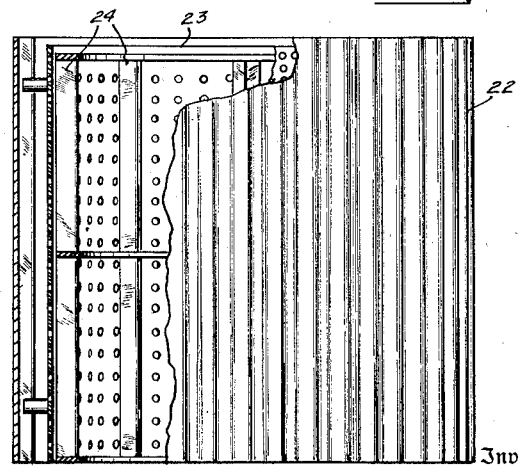
Fig. 3 is a side view, partially in section, of the concentrating table, a removable cylinder having spaced baffles inwardly extending from its inner surface to break up and to arrest the swirl of the mass being treated, the cylinder being perforated to facilitate the passing of the mass therethrough, and to permit the mass while in a quiescent state to contact the amalgamating plates.

Fig. 5 is a diagrammatical layout of the mill and of the amalgamator shown in their proper working relationship and illustrating solution holding tanks disposed above the mill and a solution settling tank disposed below the amalgamator mill and illustrating the solutions as being separated in a close cycle in order that they may be used over and over again with added material being supplied only to supplement that by evaporation and other losses. The reduction mill is adapted for gravity charging with previously reduced materials through a chute and the solutions are adapted for gravity feed from the solution tank to the mill, the over flow being carried from the reduction amalgamating mill to the amalgamator. The overflow from the amalgamating mill flows by gravity to the settling tank or basin.

Like reference characters refer to like parts throughout the several views.

The mill is primarily comprised of a base 1. A ball race 2 is disposed within the base and the race is fixedly maintained in position as through the use of screws 3. A groove 4 is disposed within the race centrally thereof and at the low point into which mercury will normally gravitate in the operation of the mill. A tap 4A is provided for tapping off the mercury and its amalgam.

Grinding balls 5 are disposed within the raceway and if the mill is to be made in the form of a double ball or twin ball mill a second double faced raceway 6 is disposed within the mill and disposed above the row of balls 5 and below the row of balls 7 so that the double faced raceway 6 has ball receiving grooves in the oppositely disposed faces thereof. The raceway carrying the double faced groove is secured to the frame as through the use of screws 8. A spider 9 is disposed within the top of the frame of the mill and an inverted raceway 10 is disposed below the spider and is secured thereto. Compression springs 11 are disposed about spindles 12 that upwardly extend from the arms of the spider 9.

A discharge spout 13 is disposed centrally of the mill and is adapted for removing the treating solutions and the finely ground residue from the central portion of the mill. A perforated hood is disposed above the discharge spout 13. A hollow frusto-conical hood 15 is disposed above the perforated end of the discharge spout and the lighter materials and the treating solutions being removed therefrom pass through suitable openings of the frusto-conical hood and escape through the discharge chute. A driving shaft runs from the driven bevel gear 16 and runs vertically through the top frame support 17 and is secured to and drives the frusto-conical hood 15 and the double faced raceway 6 that is secured thereto.

A driving bevel pinion 18 coacts with the driven bevel gear 16. The driving pinion 18 is disposed upon a shaft 19 and the power for driving the same is applied by belt or other means to a driving pulley 20 that is disposed upon the shaft 19.

The double faced raceway and the balls coacting therewith are driven at a fairly high rate of speed and at a sufficient speed to set up a centrifugal action within the mill that is directly imparted to the treating solutions and the treated mass disposed within the mill, the same being sufficient to cause the treated mass to rise substantially higher at the inner surface of the outer wall of the mill than at the discharge spout disposed central thereof so that there will be a relatively freer circulation of the lighter materials and those of greatest fluidity than there is of the heavier materials.

The materials having a high specific gravity are made to contact the inner surface of the outer wall of the device. The inner wall 21A of the mill frame is preferably made cylindrical in form, and a copper corrugated amalgamator plate 22 is disposed within the mill frame and contacts the inner surface of the cylinder 21.

The primary purpose and object of making the copper plate 22 corrugated is to increase the working area of the amalgamating plate and simultaneously therewith to create receiving pockets in the sinuous line formed by the corrugated amalgamator plate that will facilitate the settling of the materials therein as the reduction is accomplished.

A perforated wearing plate 23 is disposed in spaced relationship with the amalgamating plate and is intended as a wearing plate and also to render quiescent the materials entering and contacting with the sinuous amalgamating plate, during treatment in order that the same may be made more efficient.

A plurality of baffle bars 24 may be secured to the inner surface of the perforated wearing plate 23, or they may be independently supported, the same being spaced apart. The object and purpose of the baffle bars is to break up the swirl of the fluid mass being treated to facilitate the separation of the heavier materials being carried therein and to permit their engagement with and resting upon the sinuous surface of the amalgamator plate.

A scraper bar 25 engages the top surface of the perforated hood 14 and one or more scraper brushes 26 are secured to the inner surface of the base of the frusto-conical member to maintain the perforations 27, disposed in the side walls and the top of the perforated overflow hood in a satisfactory working condition.

It will be necessary from time to time to lift off and remove the central portion of the mill in order to replace the amalgamator plate and to make the recoveries therefrom. The assembly is so made that the total central driving assembly may be removed from the mill well in order to facilitate the removal of the same. The mass to be treated is delivered by gravity into the mill through a delivery spout 28 and the materials are led therethrough and directly into the mill. The delivery spout 13 delivers the treated mass from the mill into an amalgamator mill 29 that is disposed below the grinding and amalgamator mill sufficiently to permit a free flowing of the materials therefrom.

The lighter materials and the treating solutions emanating from the amalgamator mill 29 are delivered into a chute 57 by which they are conducted into a settling basin 58.

While I have here shown the mass being treated as passing directly from the amalgamator mill 29 to the settling basin 58, I do not wish to be limited to the direct flowing of the materials as it may be necessary in the treating of certain class of materials to pass the materials over other forms of plates to further aid in the recovery of the precious materials being treated. The treating solutions are initially placed in a tank 59 that is disposed above the primary grinding mill and the treated solutions are delivered from the tank 59 through a pipe 60 that has a valve 61 disposed therein, that permits the treating solutions to flow by gravity through the pipe directly into the primary mill. The treating solutions with other admixtures picked up are finally delivered into the settling basin 58 and from there pumped back by any suitable pumping unit 62 through the pipe 63 directly into the primary holding tank 59.

While the form of mechanism and the methods herein shown and described are admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In an ore grinding mill of the class described, the combination of a receptacle, an amalgamator plate disposed within the receptacle and adjacent the wall thereof, a perforated wear plate disposed adjacent the amalgamator plate and provided with a plurality of vertically arranged baffle bars, a plurality of ball races disposed within the receptacle, a plurality of balls rotatably mounted between the races, means for feeding material into the receptacle and into the path of movement of said balls, and screened outlet means for discharging the materials from said receptacle.

2. In an ore grinding mill of the class described, the combination of a cylindrical receptacle, a cylindrical longitudinally corrugated amalgamator plate disposed within the receptacle and adjacent the wall thereof, a cylindrical perforated wear plate disposed adjacent the amalgamator plate and provided with a plurality of vertically arranged baffle bars, a ball race fixedly mounted within the receptacle, a companion race rotatably mounted within the receptacle and formed with a race on its upper side, a companion race for the upper side of said rotatable race yieldingly mounted within the receptacle, a plurality of balls rotatably interposed between said races, said fixedly mounted ball race having an annular groove formed therein and means interconnecting with said groove and a point exterior of the receptacle for drawing off a liquid from said groove.

JOHN ANDREWSON HATTON.